US006962096B2

(12) United States Patent
Hojyo

(10) Patent No.: US 6,962,096 B2
(45) Date of Patent: Nov. 8, 2005

(54) ENGINE CASING

(75) Inventor: Atsuo Hojyo, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/385,695

(22) Filed: Mar. 12, 2003

(65) Prior Publication Data
US 2003/0209220 A1 Nov. 13, 2003

(30) Foreign Application Priority Data
Mar. 19, 2002 (JP) .............................. 2002-075829

(51) Int. Cl.⁷ .......................... F16H 57/02; F16H 3/08; F02B 75/32; F02F 7/00
(52) U.S. Cl. ............. 74/606 R; 123/197.1; 123/195 C; 74/329
(58) Field of Search .......................... 74/325, 329, 331, 74/606 R; 123/197.1, 197.5, 192.1–192.2, 123/195 C, 195 E

(56) References Cited

U.S. PATENT DOCUMENTS

| 1,360,110 | A | * | 11/1920 | Harley ........................ 74/325 |
| 4,339,964 | A | * | 7/1982 | Isaka ........................ 74/606 R |
| 4,565,269 | A | * | 1/1986 | Kawasaki et al. ....... 192/70.12 |
| 5,038,731 | A | * | 8/1991 | Shimada ................... 123/192.2 |
| 5,218,885 | A | * | 6/1993 | Nakano et al. ............... 74/591 |
| 5,241,934 | A | * | 9/1993 | Laimbock ............... 123/195 C |
| 5,960,761 | A | * | 10/1999 | Kawakubo et al. ...... 123/192.2 |
| 6,715,376 | B2 | * | 4/2004 | Hojyo et al. .................. 74/414 |
| 2002/0043237 | A1 | * | 4/2002 | Nomura et al. ......... 123/196 R |

FOREIGN PATENT DOCUMENTS

JP  6-048346 A  2/1994

* cited by examiner

Primary Examiner—Roger Pang
(74) Attorney, Agent, or Firm—Birch, Stewart, Kolasch & Birch, LLP

(57) ABSTRACT

To enable the miniaturization of a crankcase side cover to lighten it in a casing of an engine and to enable the reduction of the area of each joined face to make performance for sealing the joined faces of a crankcase and the crankcase side cover satisfactory. In a casing of an engine composed of a crankcase, a crankcase side cover the inner end of which is joined to one side end of the crankcase and which covers a primary reduction gear and a clutch cover which is joined to the outer end of the crankcase side cover and which houses a clutch together with the crankcase side cover, the inside diameter d of the joined faces of a clutch enclosure enclosing the clutch of the crankcase side cover and the crankcase is set so that the inside diameter is smaller than the outside diameter D of a clutch outer in the clutch.

22 Claims, 3 Drawing Sheets

ENGINE CASING

CROSS-REFERENCE TO RELATED APPLICATIONS

The present nonprovisional application claims priority under 35 USC 119 to Japanese Patent Application No. 2002-075829 filed on Mar. 19, 2002 the entire contents thereof is hereby incorporated by reference.

BACKGROUND OF THE INVENTION

1. Field of the Invention

The present invention relates to the casing of an engine provided with a crankshaft. A shift input shaft and a shift output shaft are provided with a clutch mounted at one end of the shift input shaft and a primary reduction gear that reduces the rotational speed of the crankshaft and transmits it to the clutch, which are arranged mutually in parallel. In more detail, the invention relates to a casing composed of a crankshaft, a crankcase supporting a shift input shaft and a shift output shaft, a crankcase side cover the inner end of which is joined to one side end of the crankcase and which covers a primary reduction gear and a clutch cover which is joined to the outer end of the crankcase side cover and which forms a clutch chamber for housing a clutch together with the side cover.

2. Description of Background Art

Such a casing of an engine is already known as disclosed in Japanese published unexamined patent application No. Hei 6-48346 for example.

Heretofore, in such a casing of an engine, as the internal wall of a crankcase side cover is extended opposite to a crankcase, the crankcase side cover is of a large-size, as a result, the weight of the crankcase side cover is increased, the inside diameter on the side of a clutch enclosure of the joined faces of the crankcase and the crankcase side cover is larger than the outside diameter of a clutch and the area of each joined face is increased.

SUMMARY AND OBJECTS OF THE INVENTION

The invention is made in view of such a situation and it is an object of the present invention to provide a casing of an engine in which a crankcase side cover is miniaturized to lighten the crankcase side cover. In addition, the area where the crankcase and the crankcase side cover are joined is reduced to enhance performance for sealing the joined faces of the crankcase and the crankcase side cover.

To achieve the object, the invention is based upon a casing of an engine provided with a crankshaft, a shift input shaft and a shift output shaft, a clutch mounted at one end of the shift input shaft and a primary reduction gear that reduces the rotational speed of the crankshaft and transmits it to the clutch, which are arranged mutually in parallel. In other words, a casing of an engine is composed of a crankshaft, a crankcase supporting a shift input shaft and a shift output shaft, a crankcase side cover the inner end of which is joined to one side end of the crankcase and which covers a primary reduction gear and a clutch cover which is joined to the outer end of the crankcase side cover and which forms a clutch chamber for housing a clutch together with the side cover. The inside diameter of the joined faces of a clutch enclosure enclosing the clutch of the crankcase side cover and the crankcase is set so that the inside diameter is smaller than the outside diameter of a clutch outer in the clutch.

The crankcase side cover and a gear on the driving side correspond to a right crankcase side cover 6 and a second idle gear 33b in an embodiment described later of the invention.

According to the first characteristic, the clutch the clutch outer of which has a large outside diameter and which has large capacity can be housed in the clutch chamber, simultaneously a dead space inside the crankcase side cover is reduced and the crankcase side cover can be miniaturized and lightened. In addition, as the inside diameter of the joined faces of the clutch enclosure of the crankcase side cover and the crankcase is set so that the inside diameter is smaller than the outside diameter of the clutch outer, the area of each joined face is reduced and performance for sealing the joined faces can be enhanced.

Also, in addition to the first characteristic, the invention is also directed to a primary reduction gear that is formed by a driven gear coupled to the inner end wall of a clutch outer that protrudes into a crankcase side cover and includes a smaller diameter than the clutch outer. A gear is provided on the driving side driven by a crankshaft and engaged with the driven gear and a part in which the gear on the driving side and the driven gear are engaged is arranged in the crankcase side cover.

According to the second characteristic, the shape of a clutch enclosure of the crankcase side cover can be adjusted to the shape of the inner end wall of the clutch outer and the shape of the driven gear and the crankcase side cover can be miniaturized and lightened.

The quantity of an overhang from the crankcase of the primary reduction gear is possibly reduced and the durability of the crankshaft, the shift input shaft and their bearings can be enhanced.

Further, quantity in which a part that covers the primary reduction gear of the crankcase side cover protrudes from the side end of the crankcase is possibly reduced and the crankcase side cover can be further miniaturized and lightened.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The invention will be described based upon one embodiment shown in attached drawings below.

Figure 1:
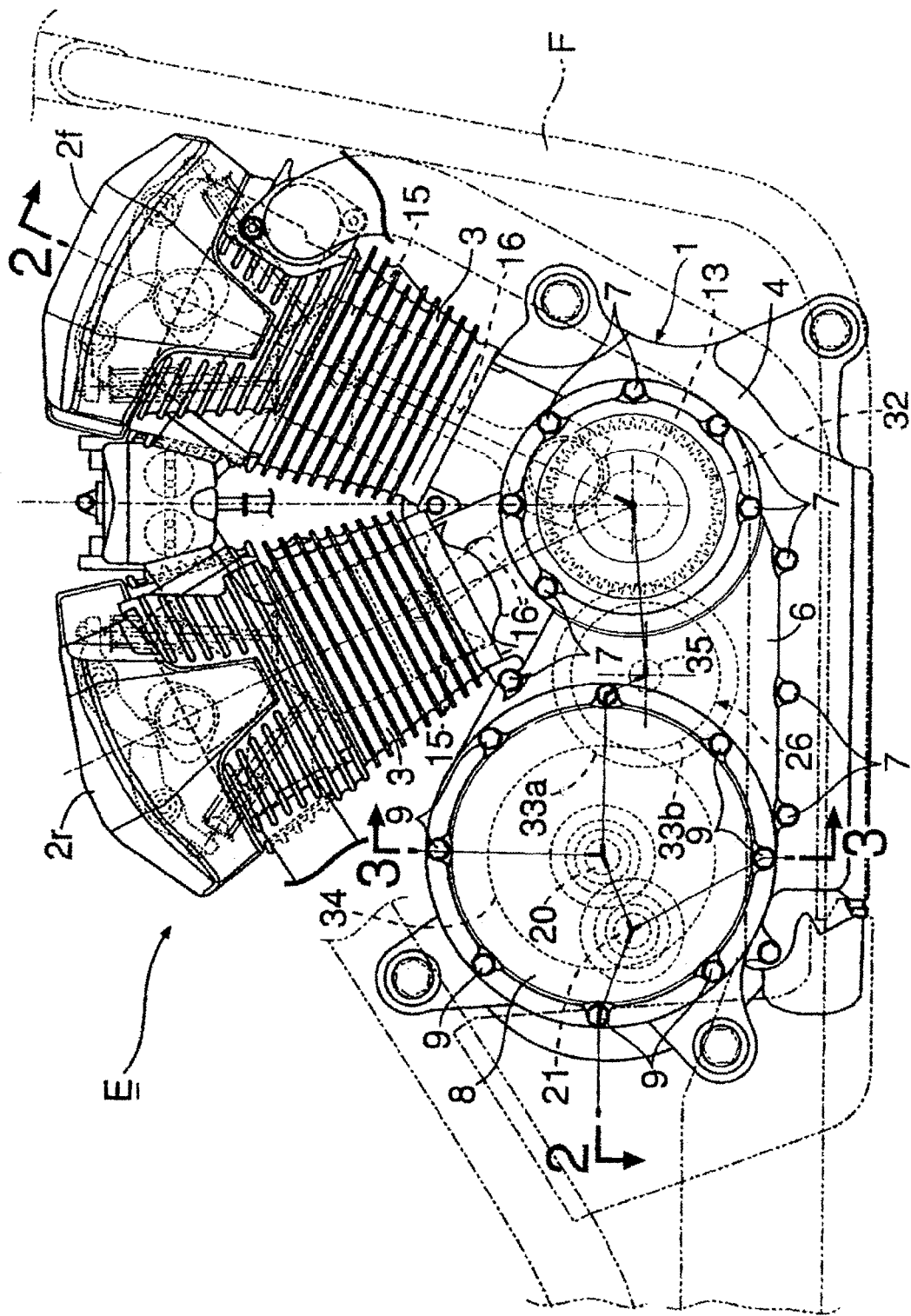
FIG. 1 is a side view showing an engine for a motorcycle provided with a casing according to the invention.

First, as shown in FIG. 1, the engine E mounted in a body frame 1 of the motorcycle is formed in V type wherein its front bank 2f and its rear bank 2r protrude from the front upside of the casing 1 according to the invention in V type.

Figure 2:
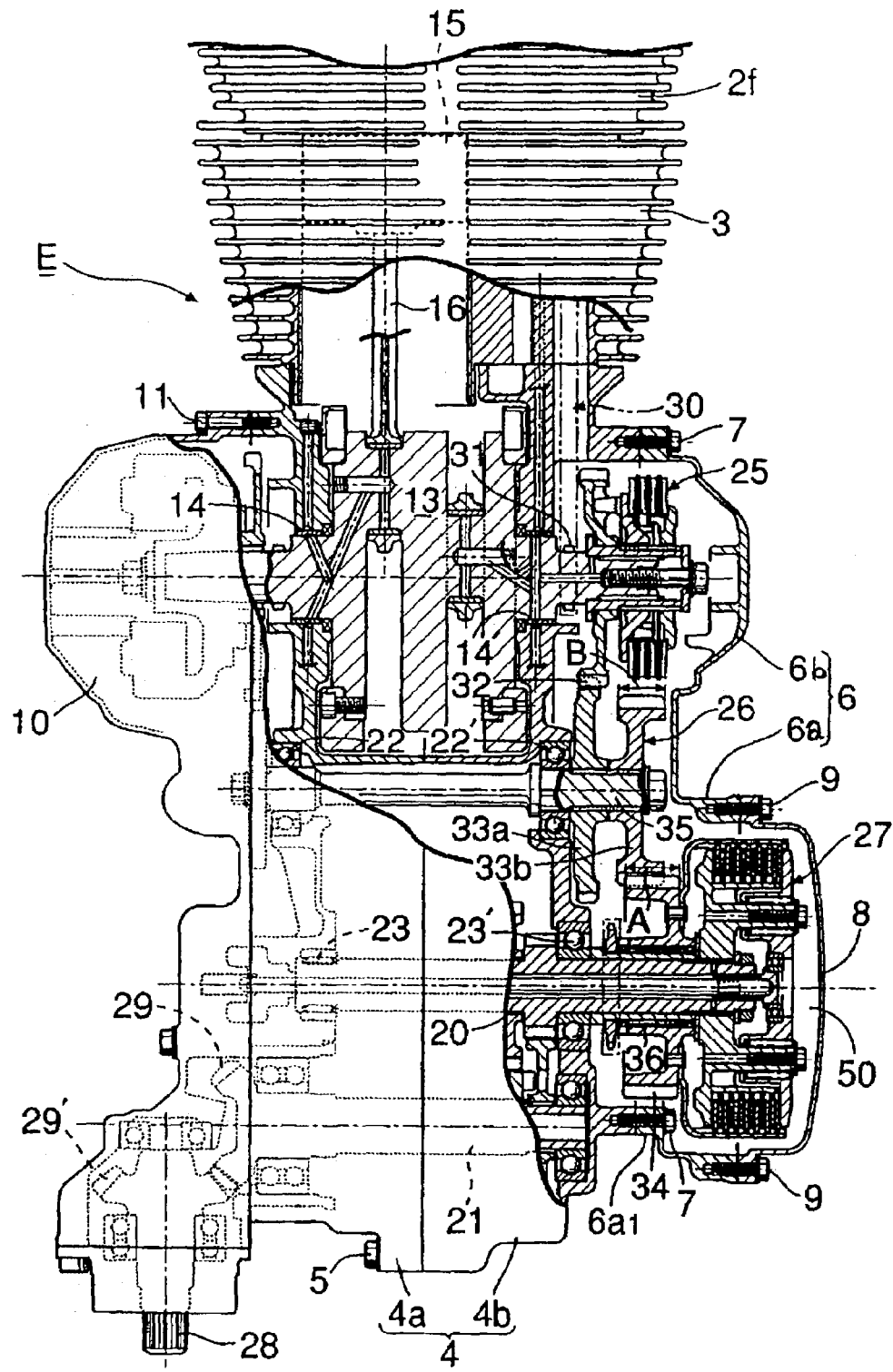
FIG. 2 is a sectional view viewed along a line 2—2 in FIG. 1.

As shown in FIGS. 1 and 2, the casing 1 is provided with a common crankcase 4 connected to the respective cylinder blocks 3, 3 of both banks 2f, 2r, a right crankcase side cover 6 joined to the right end of the crankcase 4 by multiple bolts 5, 5, - - -, a clutch cover 8 joined to the outer end of the right crankcase side cover 6 by multiple bolts 7, 7 - - - and a left crankcase side cover 10 joined to the left end of the crankcase 4 by multiple bolts 11, 11, - - - .

A sealing member such as a gasket is inserted between the joined faces of each of the above-mentioned.

The right and left crankcase halves 4a, 4b of the crankcase 4 are connected by multiple bolts 5, 5, - - - and the respective side walls of both crankcase halves 4, 4b support both ends of a crankshaft 13 via plane bearings 14, 14'. The crankshaft 13 is linked to pistons 15, 15 in both banks 2f, 2r via connecting rods 16, 16. Both crankcase halves 4a, 4b support the respective both ends of a shift input shaft 20 and a shift output shaft 21 respectively arranged in parallel with the crankshaft 13 via ball or needle bearings 22, 22'; 23, 23', and multi-stage speed change gear drive $24_1$ to $24_5$ (see FIG. 3) is provided between the shift input/output shafts 20, 21.

Figure 3:
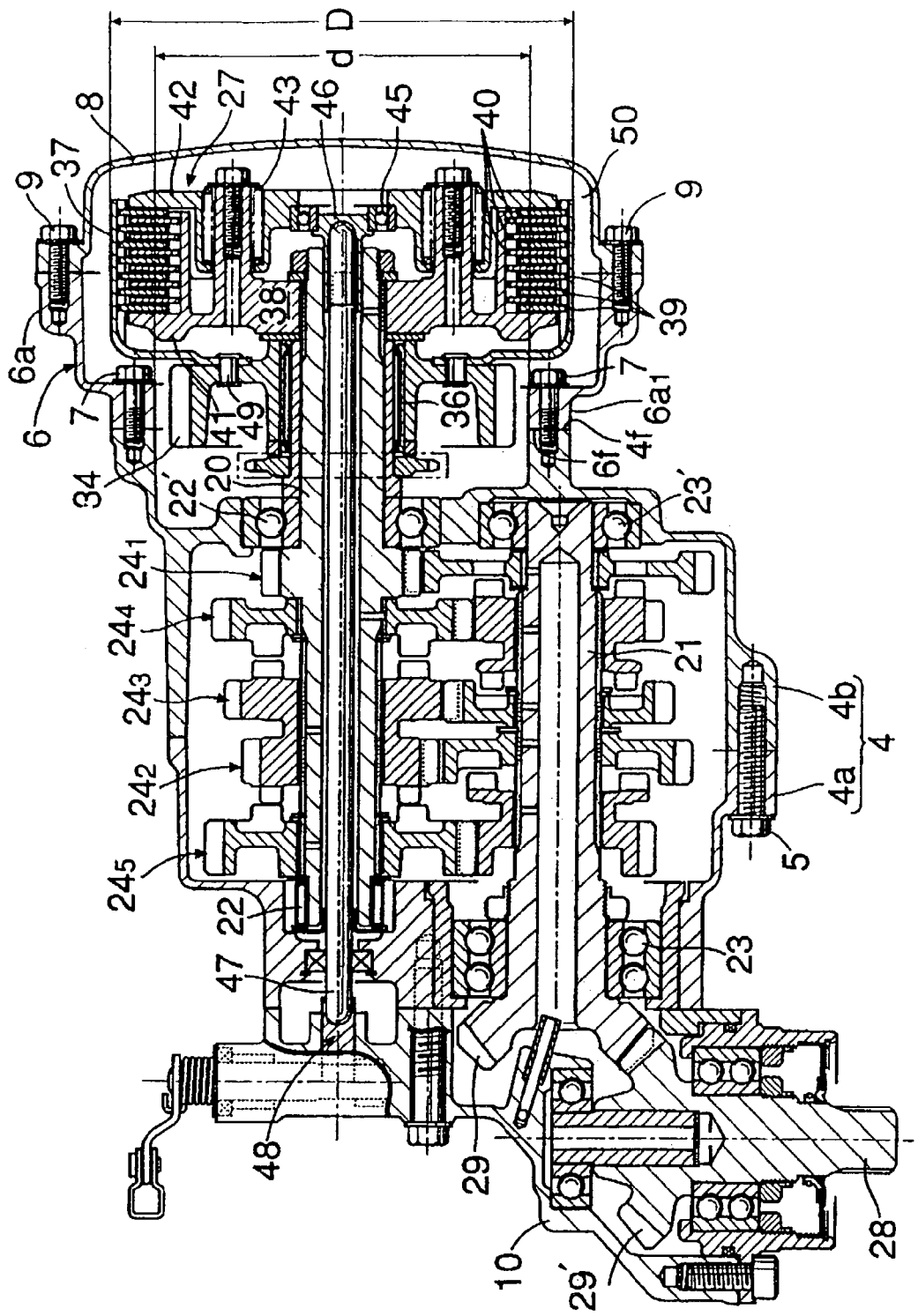
FIG. 3 is a sectional view viewed along a line 3—3 in FIG. 1.

As shown in FIGS. 2 and 3, each right end of the crankshaft 13 and the shift input shaft 20 protrudes on the side of the right crankcase side cover 6, and the right ends of the crankshaft 13 and the shift input shaft 20 are coupled via a torque damper 25, a primary reduction gear 26 and a clutch 27. The left end of the shift output shaft 21 protrudes on the side of the left crankcase side cover 10, and the left crankcase side cover 10 supports a driving shaft 28 which is coupled to the shift output shaft via a pair of bevel gears 29, 29' wherein the output end of which is directed toward the rear of the motorcycle.

As shown in FIG. 2, a driving sprocket 31 of a timing transmission gear for a valve 30 of the front bank 2f, a driving gear 32 of the primary reduction gear 26 and the torque damper 25 are sequentially provided to the right end of the crankshaft 13 from the side of the crankcase 4, and the torque damper 25 absorbs the rapid variation of rotating torque between the crankshaft 13 and the driving gear 32.

The primary reduction gear 26 is composed of the driving gear 32, a first idle gear 33a connected to an idle shaft 35 via a spline supported by the crankcase 4 so that the idle shaft can be rotated and engaged with the driving gear 32, a second idle gear 33b adjacent to the outside of the first idle gear 33a, connected to the idle shaft 35 via a spline and having a smaller diameter than the first idle gear 33a and a driven gear 34 supported by the shift input shaft 20 via a needle bearing 36 so that the driven gear 34 can be rotated and engaged with the second idle gear 33b. The driven gear 34 is fixed to the internal end wall of a cylindrical clutch outer 37 with the bottom in the clutch 27. Therefore, the primary reduction gear 26 can decelerate rotation transmitted from the crankshaft 13 to the torque damper 25 and can transmit it to the clutch 27.

As shown in FIG. 3, the clutch 27 is composed of the cylindrical clutch outer with the bottom 37, a clutch inner 38 arranged in the center of the clutch outer 37 and fixed to the shift input shaft 20, plural driving friction plates 39, 39, - - - fitted to the inside wall of the clutch outer 37 via a spline so that the driving friction plate can be axially slid, plural driven friction plates 40, 40, - - - each of which is alternately piled on each of the driving friction plates 39, 39, - - - and which are fitted to the periphery of the clutch inner 38 via a spline so that the driven friction plate can be slid, a pressed plate 41 which is integrated with the inner end of the clutch inner 38 and which can catch the innermost driving friction plate 39, a pressurizing plate 42 which is attached to the outer end of the clutch inner 38 so that the pressurizing plate can be slid and which can press the outermost driving friction plate 39 and a clutch spring 43 for pressing the pressurizing plate 42 toward the pressed plate 41.

When a group of the driving and driven friction plates 39, 40 is pressed between the pressurizing plate 42 and the pressed plate 41 by pressure by the clutch spring 43, the clutch outer 37 and the clutch inner 38 are mutually coupled by frictional force and the clutch is turned on.

Therefore, in a state in which the clutch 27 is turned on, motive power generated by the crankshaft 13 is transmitted to the shift input shaft 20 via the torque damper 25, the primary reduction gear 26 and the clutch 27, is further transmitted to the shift output shaft 21 via selected any of the speed change gear drive $24_1$ to $24_5$, is further transmitted to the driving shaft 28 via the bevel gears 29, 29' and to the rear wheels of the motorcycle via a propeller shaft not shown for driving the rear wheels.

A release member 46 is provided to the center of the clutch inner 38 via a release bearing 45 and the inner end of a push rod 47 that pierces a hollow part of the shift input shaft 20 is linked to the release member 46. A clutch lever (not shown) of the motorcycle is linked to the outer end of the push rod 47 via a cam mechanism 48.

When the push rod 47 is pressed by operating the clutch lever and the pressurizing plate 42 is backed against pressure by the clutch spring 43, each friction plate 39, 40 is made free. The coupling of the clutch outer 37 and the clutch inner 38 is released and the clutch is turned off.

As clearly shown in FIG. 3, the driven gear 34 of the primary reduction gear 26 is fixed to the inner wall of the clutch outer 37 via a rivet 49. The outside diameter of the driven gear 34 is set so that it is larger than the outside diameter of the second idle gear 33b and the outside diameter of the clutch inner 37 is further larger than the outside diameter of the driven gear 34. The face width A of the driven gear 34 is set so that it is larger than the face width B of the second idle gear 33b.

The right crankcase side cover 6 is composed of a cylindrical clutch enclosure 6a that encloses the clutch outer 37 and a cover 6b that overhangs forward from one side of the clutch enclosure 6a and covers the torque damper 25 and the primary reduction gear 26. A clutch chamber 50 for housing the clutch 27 is formed by the clutch enclosure 6a and the circular clutch cover 8 joined to its outer end. At that time, the joined faces of the right crankcase side cover 6 and the clutch cover 8 are arranged in the axial middle of the clutch outer 37.

The inner end $6a_1$ of the clutch enclosure 6a of the right crankcase side cover 6 is indented, approaching the periphery of the driven gear 34 so that the inner end is opposite to the inner end wall of the clutch outer 37. Thereby, the inside diameter d of the joined faces 6f, 4f of the clutch enclosure 6a and the crankcase 4 is set so that the inside diameter is smaller than the outside diameter D of the clutch outer 37.

The driven gear 34 has a face width enough to protrude into the side of the right crankcase side cover 6 and a part protruding into the right crankcase side cover 6 is engaged with the second idle gear 33b.

As the clutch 27 is exposed from the clutch enclosure 6a of the right crankcase side cover 6 when the bolts 9, 9 - - - are detached and the clutch cover 8 is separated from the right crankcase side cover 6, the detachment of the clutch 27 from the shift input shaft 20 and the disassembly of the clutch 27 are enabled and the maintenance performance is made satisfactory.

As the torque damper 25 and the primary reduction gear 26 are exposed when the bolts 7, 7 - - - are detached and the right crankcase side cover 6 is separated from the crankcase 4 after the clutch 27 is detached from the shift input shaft 20, maintenance can be facilitated.

As the inner end $6a_1$, of the clutch enclosure 6a of the right crankcase side cover 6 is indented in accordance with each shape of the inner end wall of the clutch outer 37 and the driven gear 34, dead space inside the right crankcase side cover 6 is reduced, enabling the clutch 27 the clutch outer of which has a large outside diameter and which has large capacity to be housed in the clutch chamber 50 and the right crankcase side cover 6 can be miniaturized and lightened.

As the inside diameter d of the joined faces 6f, 4f of the clutch enclosure 6a of the right crankcase side cover 6 and the crankcase 4 is set so that the inside diameter is smaller than the outside diameter D of the clutch outer 37, the area of each joined face 6f, 4f is reduced, performance for sealing the joined faces 6f, 4f is enhanced, and simultaneously, the number of the bolts 7, 7, - - - used for connecting the crankcase 4 and the right crankcase side cover 6 can be reduced.

As the primary reduction gear 26 is formed by engaging the driving gear 32 with a part protruding into the right crankcase side cover 6 of the driven gear 34 fixed to the clutch outer 37 via the first and second idle gears 33a, 33b, the quantity of an overhang of the primary reduction gear 26 from the crankcase 4 is reduced possibly, and the durability of the crankshaft 13, the shift input shaft 20 and their bearings can be enhanced.

In addition, as the driving gear 32 is engaged with the part protruded into the right crankcase side cover 6 of the driven gear 34 via the first and second idle gears 33a, 33b and in addition, the cover 6b that covers these is integrated with the right crankcase side cover 6, the protruding quantity of the cover 6b from the side end of the crankcase 4 is possibly reduced and the right crankcase side cover 6 can be miniaturized and lightened.

The invention is not limited to the embodiment described above and various design changes without deviating from the scope of the invention are allowed. For example, the invention may be also applied to an engine having only an erect type of single bank.

As described above, according to the first characteristic of the invention, as in the casing of the engine provided with the crankshaft, the shift input shaft and the shift output shaft, the clutch mounted at one end of the shift input shaft and the primary reduction gear that reduces the rotational speed of the crankshaft and transmits it to the clutch, which are arranged mutually in parallel. In other word, the composition of the crankshaft, the crankcase supporting the shift input shaft and the shift output shaft, the crankcase side cover the inner end which is joined to one side end of the crankcase and which covers the primary reduction gear and the clutch cover which is joined to the outer end of the crankcase side cover and which forms the clutch chamber for housing the clutch together with the side cover, the inside diameter of the joined faces of the clutch enclosure that encloses the clutch of the crankcase side cover and the crankcase is set so that the inside diameter is smaller than the outside diameter of the clutch outer in the clutch. Thus, a dead space inside the crankcase side cover is reduced, enabling the clutch having the clutch outer having a large outside diameter and having a large capacity to be housed in the clutch chamber and the crankcase side cover can be miniaturized and lightened. In addition, as the inside diameter of the joined faces of the clutch enclosure of the crankcase side cover and the crankcase is set so that the inside diameter is smaller than the outside diameter of the clutch outer, the area of each joined face is reduced and performance for sealing the joined faces can be enhanced.

Also, according to the second characteristic of the invention, in addition to the first characteristic, as the primary reduction gear is formed by the driven gear coupled to the inner end wall of the clutch outer, protruding into the crankcase side cover and having a smaller diameter than the clutch outer and the gear on the driving side driven by the crankshaft and engaged with the driven gear and a part in which the gear on the driving side and the driven gear are engaged is arranged in the crankcase side cover, the shape of the clutch enclosure of the crankcase side cover can be adjusted to the shape of the inner end wall of the clutch outer and the shape of the driven gear and the crankcase side cover can be miniaturized and lightened, the quantity of an overhang from the crankcase of the primary reduction gear is possibly reduced and the durability of the crankshaft, the shift input shaft and their bearings can be enhanced. Further, the quantity in which a part that covers the primary reduction gear of the crankcase side cover that protrudes from the side end of the crankcase is possibly reduced and the crankcase side cover can be further miniaturized and lightened.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A casing of an engine comprising:
   a crankshaft;
   a shift input shaft and a shift output shaft;
   a clutch mounted at one end of the shift input shaft and a primary reduction gear that reduces the rotational speed of the crankshaft and transmits it to the clutch, said shift input shaft and said shift output shaft being arranged mutually in parallel;
   a crankcase for supporting the shift input shaft and the shift output shaft;
   a crankcase side cover having an inner end and an outer end, the inner end of the crankcase side cover being joined to one side end of the crankcase for covering the primary reduction gear; and
   a clutch cover joined to the outer end of the crankcase side cover, the clutch cover and the crankcase side cover forming a clutch chamber for housing the clutch,
   wherein an inside diameter of joined faces of a clutch enclosure portion of the crankcase side cover and the crankcase is set to be smaller than an outside diameter of a clutch outer of the clutch, and
   wherein joined faces of the clutch cover and the crankcase side cover, and also the joined faces of the crankcase side cover and the crankcase, surround an axis of a shift input shaft.

2. The casing of an engine according to claim 1, wherein:
   the primary reduction gear is formed by a driven gear coupled to the inner end wall of a clutch outer, protruding into the crankcase side cover and having a smaller diameter than the clutch outer and a gear on the driving side driven by a crankshaft and engaged with the driven gear; and
   a part in which the gear on the driving side and the driven gear are engaged is arranged in the crankcase side cover.

3. The casing of an engine according to claim 1, and further including a driving gear, a first idle gear connected to an idle shaft, a second idle gear disposed adjacent to an outside of the first idle gear and a driven gear supported by the shift input shaft wherein the driven gear is rotated and engaged with the second idle gear.

4. The casing of an engine according to claim 2, and further including a torque damper for absorbing variation of rotating torque between the crankshaft and the driving gear.

5. The casing of an engine according to claim 4, wherein the primary reduction gear decelerates rotation transmitted from the crankshaft to the torque damper for transmitting the rotation to the clutch.

6. The casing of an engine according to claim 1, wherein the clutch includes a cylindrical clutch outer with a bottom, a clutch inner arranged in the center of the clutch outer and fixed to the shift input shaft, plural driving friction plates fitted to the inside wall of the clutch outer via a spline so that the driving friction plate can be axially slid, plural driven friction plates each of which is alternately piled on each of the driving friction plates and being fitted to the periphery of the clutch inner via a spline so that the driven friction plate can be slid, a pressed plate which is integrated with the inner end of the clutch inner and which can catch the innermost driving friction plate, a pressurizing plate which is attached to the outer end of the clutch inner so that the pressurizing plate can be slid and for pressing the outermost driving friction plate and a clutch spring for pressing the pressurizing plate toward the pressed plate.

7. The casing of an engine according to claim 3, wherein an outside diameter of the driven gear is larger than the outside diameter of the second idle gear and the outside diameter of a clutch inner is larger than the outside diameter of the driven gear.

8. The casing of an engine according to claim 7, wherein a face width of the driven gear is larger than the face width of the second idle gear.

9. The casing of an engine according to claim 1, wherein when the clutch enclosure is detached from the crankcase side cover the clutch is conveniently located for maintenance.

10. The casing of an engine according to claim 1, wherein the clutch cover is fastened to the crankcase side cover on two sides of the clutch.

11. The casing of an engine according to claim 1, wherein the clutch cover is circular.

12. The casing of an engine according to claim 1, wherein the joined faces of the clutch cover and the crankcase side cover form a circular ring around the clutch.

13. A casing of an engine comprising:
a shift input shaft and a shift output shaft;
a crankcase for supporting the shift input shaft and the shift output shaft;
a clutch mounted at one end of the shift input shaft and a primary reduction gear that reduces the rotational speed of a crankshaft for transmitting rotation to the clutch;
a crankcase side cover having an inner end and an outer end, the inner end of the crankcase side cover being joined to one side end of the crankcase for covering the primary reduction gear; and
a clutch cover joined to the outer end of the crankcase side cover, the clutch cover and the crankcase side cover forming a clutch chamber for housing the clutch,
wherein an inside diameter of joined faces of a clutch enclosure portion of the crankcase side cover and the crankcase is set to be smaller than an outside diameter of a clutch outer of the clutch, and
wherein joined faces of the clutch cover and the crankcase side cover, and also the joined faces of the crankcase side cover and the crankcase, surround an axis of a shift input shaft.

14. The casing of an engine according to claim 13, wherein:
the primary reduction gear is formed by a driven gear coupled to the inner end wall of a clutch outer, protruding into the side cover and having a smaller diameter than the clutch outer and a gear on the driving side driven by a crankshaft and engaged with the driven gear; and
a part in which the gear on the driving side and the driven gear are engaged is arranged in the side cover.

15. The casing of an engine according to claim 13, and further including a driving gear, a first idle gear connected to an idle shaft, a second idle gear disposed adjacent to an outside of the first idle gear and a driven gear supported by the shift input shaft wherein the driven gear is rotated and engaged with the second idle gear.

16. The casing of an engine according to claim 14, and further including a torque damper for absorbing variation of rotating torque between the crankshaft and the driving gear.

17. The casing of an engine according to claim 16, wherein the primary reduction gear decelerates rotation transmitted from the crankshaft to the torque damper for transmitting the rotation to the clutch.

18. The casing of an engine according to claim 13, wherein the clutch includes a cylindrical clutch outer with a bottom, a clutch inner arranged in the center of the clutch outer and fixed to the shift input shaft, plural driving friction plates fitted to the inside wall of the clutch outer via a spline so that the driving friction plate can be axially slid, plural driven friction plates each of which is alternately piled on each of the driving friction plates and being fitted to the periphery of the clutch inner via a spline so that the driven friction plate can be slid, a pressed plate which is integrated with the inner end of the clutch inner and which can catch the innermost driving friction plate, a pressurizing plate which is attached to the outer end of the clutch inner so that the pressurizing plate can be slid and for pressing the outermost driving friction plate and a clutch spring for pressing the pressurizing plate toward the pressed plate.

19. The casing of an engine according to claim 15, wherein an outside diameter of the driven gear is larger than the outside diameter of the second idle gear and the outside diameter of a clutch inner is larger than the outside diameter of the driven gear.

20. The casing of an engine according to claim 19, wherein a face width of the driven gear is larger than the face width of the second idle gear.

21. The casing of an engine according to claim 13, wherein when the clutch enclosure is detached from the crankcase side cover the clutch is conveniently located for maintenance.

22. A casing of an engine comprising:
a crankshaft;
a shift input shaft and a shift output shaft
a clutch mounted at one end of the shift input shaft and a primary reduction gear that reduces the rotational speed of the crankshaft and transmits it to the clutch, said shift input shaft and said shift output shaft being arranged mutually in parallel;
a crankcase for supporting the shift input shaft and the shift output shaft;
a crankcase side cover having an inner end and an outer end, the inner end of the crankcase cover being joined to one side end of the crankcase for covering the primary reduction gear; and
a clutch cover joined to the outer end of the crankcase side cover, the clutch cover and the crankcase side cover for forming a clutch chamber for housing a clutch together with the side cover,
wherein an inside diameter of joined faces of a clutch enclosure portion of the crankcase side cover and the crankcase is set to be greater than and outside diameter of a driven gear, and is set to be smaller than an outside diameter of the clutch.

* * * * *